United States Patent
Nutz et al.

[11] Patent Number: 5,352,967
[45] Date of Patent: Oct. 4, 1994

[54] METHOD AND APPARATUS FOR CHARGING STORAGE BATTERIES TO FULL CAPACITY

[75] Inventors: Karl-Diether Nutz, Oedheim; Dieter Hanselmann, Öhringen, both of Fed. Rep. of Germany

[73] Assignee: Temic Telefunken microelectronic GmbH, Heilbronn, Fed. Rep. of Germany

[21] Appl. No.: 136,930

[22] Filed: Oct. 18, 1993

[30] Foreign Application Priority Data

Dec. 23, 1992 [DE] Fed. Rep. of Germany ....... 4243710

[51] Int. Cl.$^5$ .............................................. H02J 7/04
[52] U.S. Cl. .................................. 320/20; 320/21; 320/31
[58] Field of Search .................... 320/20, 21, 22, 23, 320/24, 31, 32, 39, 40

[56] References Cited

U.S. PATENT DOCUMENTS

| | | | |
|---|---|---|---|
| 3,800,208 | 3/1974 | Macharg | 320/20 |
| 4,163,933 | 8/1979 | Foster | 320/20 |
| 4,395,672 | 7/1983 | Gassaway | 320/31 |
| 4,396,880 | 8/1983 | Windebank | 320/21 |
| 4,418,310 | 11/1983 | Bollinger | 320/39 |
| 4,746,852 | 5/1988 | Martin | 320/20 |
| 4,855,663 | 8/1989 | Matsui et al. | 320/20 |
| 5,157,320 | 10/1992 | Kuriloff | 320/39 |
| 5,180,961 | 1/1993 | Tsujino | 320/20 |

FOREIGN PATENT DOCUMENTS

| | | |
|---|---|---|
| 0311460 | 4/1989 | European Pat. Off. ............. 320/20 |
| 2915487 | 10/1980 | Fed. Rep. of Germany . |
| 3044659 | 6/1982 | Fed. Rep. of Germany . |
| 3309543 | 9/1984 | Fed. Rep. of Germany . |
| 3606991 | 9/1987 | Fed. Rep. of Germany . |
| 3917795 | 12/1989 | Fed. Rep. of Germany . |
| 9004061 | 8/1990 | Fed. Rep. of Germany . |
| 4033119 | 4/1991 | Fed. Rep. of Germany . |

*Primary Examiner*—Kristine L. Peckman
*Attorney, Agent, or Firm*—Spencer, Frank & Schneider

[57] ABSTRACT

A charging method for storage batteries, in particular for NiCd and NiH cells. In accordance with the invention, the charging operation is cyclically interrupted for the purpose of measuring the charging voltage. During these measurement intervals, the charging voltage is cyclically compared with a reference value. If the value of the actual charging voltage is greater than this reference value, the latter is increased by a certain amount to match it to the actual value of the charging voltage and then stored. By contrast, the number of measurement cycles is counted in which the value of the measured charging voltage is consecutively equal to or less than the maximum stored reference value. Finally, the charging current source is switched off or the charging current is reduced at a preset counter reading. As a result, maximum utilization of the available effective capacity together with extensive protection against overcharging is achieved. In addition, the method in accordance with the invention ensures the inexpensive provision of a charging circuit.

8 Claims, 5 Drawing Sheets

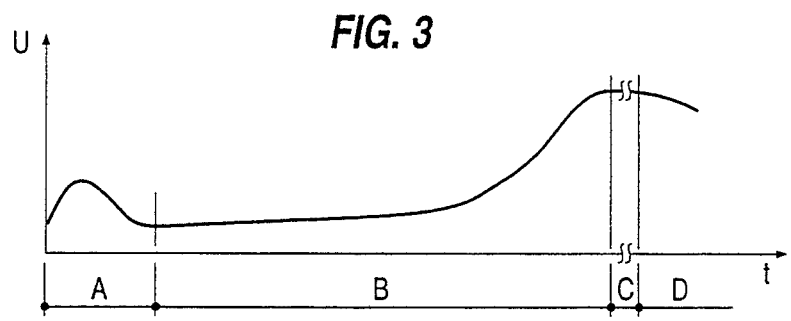
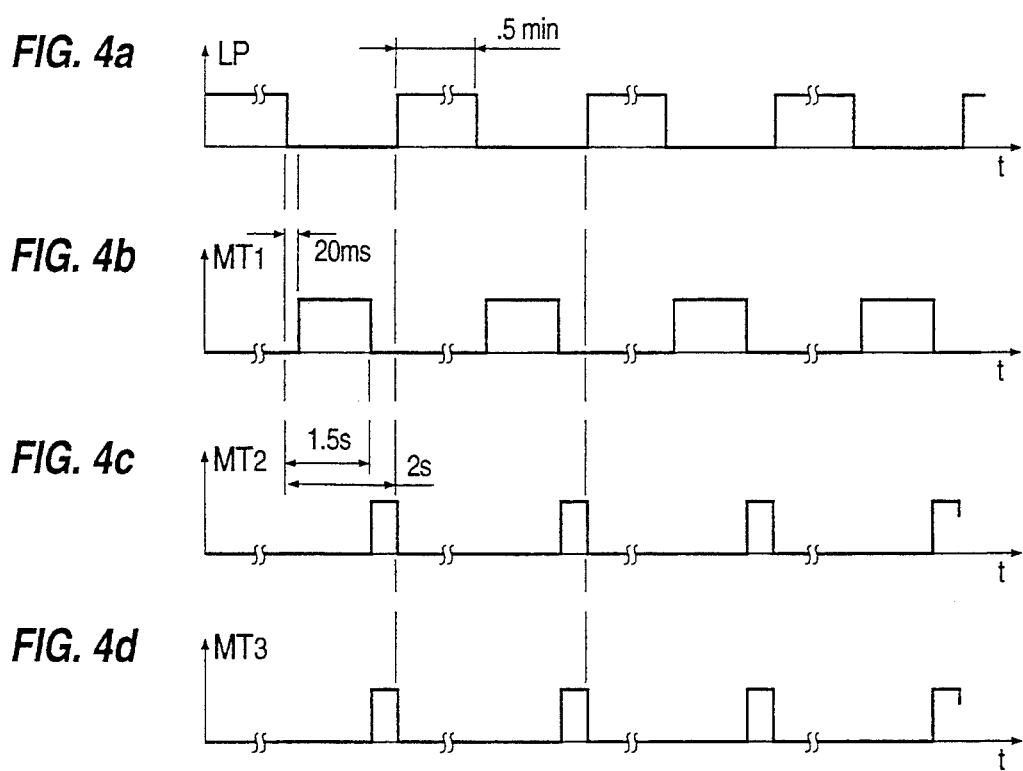

METHOD AND APPARATUS FOR CHARGING STORAGE BATTERIES TO FULL CAPACITY

BACKGROUND OF THE INVENTION

The invention relates to a charging method for storage batteries, in particular for NiCd (nickel-cadmium) and NiH (nickel hydride) cells. In addition, a circuit array for implementation of the method in accordance with the invention is provided.

A large number of portable electronic devices (e.g. portable phones, laptops, camcorders etc.) have become available in recent years, which as a rule however cannot be connected to the power mains using a lead. Accordingly, battery-powered operation must be ensured, with these batteries having to be kept in a continuous state of operational readiness. The problem this entails is that the battery must be charged as fully as possible, but without damaging it by overcharging.

The various charging methods are constant current charge mode, delta temperature/delta time charge mode, negative delta voltage charge mode, positive delta voltage charge mode, pulse charge mode and reflex charge mode.

The first two methods are the least expensive ones. In the first-named method, the battery is continuously overcharged with a low current (0.1 I). The expenditure for a constant current source is low, however the long charging time is a drawback and rapidly leads to damage of the cells. It is also standard practice to restrict the charging time in this charging method. The charging operation is therefore broken off as soon as a defined time has elapsed. However, this does not take into account the charge state, for which reason similar problems are encountered here as in permanent overcharging.

With delta temperature/delta time charging, the charging current is switched off once a certain temperature has been reached, for example 45° C., or once a difference between the ambient temperature and the battery temperature has been reached. This method too ignores the charge state of the battery. Also, it cannot be ruled out that at high ambient temperatures the cells might suffer damage. Finally, the temperature curve of these damaged cells is absolutely unpredictable.

The damage to the cells occurring with the methods described lead to a premature reduction of the available capacity.

In the negative delta voltage charge mode, the fall in the charge curve after complete charging of the battery is used as the switch-off criterion. If batteries, particularly NC and NH batteries, are charged from a constant current source, the charging voltage rises steadily for as long as the cell is capable of converting the supplied energy into chemical energy. When the batteries are no longer capable of storing the supplied energy, the latter is converted into heat and the cell voltage drops, with the end of charging being recognized at the same time. This method can however only be used for those battery types permitting high current charging. This charging method itself has the drawback that during the quick-charge operation surface effects take place in the cell, leading to fluctuations in the battery voltage and causing a premature break-off of the charging operation. For that reason, long-term integration over several measuring cycles, or better still repeated measured value recording and storage, is necessary to detect incorrect measured values by mathematical operations or to rule out such values by interpolation. Realization of a long-term integration by means of analog circuit technology requires considerable expenditure, whereas mathematical processing of the measured values entails the use of a microprocessor. Since NC batteries have a considerably more pronounced charging voltage curve than NH batteries, a more precise evaluation of the charge curve is essential for the latter, for example over several measured values. NH batteries are always overcharged with this charging method.

In the positive delta voltage charge mode, the gradient of the rising charge curve is evaluated. With the battery almost completely charged, the rise in the charging voltage decreases again. By mathematical differentiation of the charge curve, the reduction in the rise can be evaluated as the charge stop criterion. Since several different mathematical operations have to be performed with this method, a microprocessor is almost the only possible solution, as is proposed in U.S. Pat. No. 4,746,852.

The pulse charging mode is known from EP-A-03 11 460. Charging is achieved with very high current pulses. The battery voltage is measured here during a currentless phase and compared with a fixed reference value. The charging operation is ended as soon as the battery voltage has reached this reference value. Since the batteries have manufacturer-related differences in their voltage situations, this fixed reference value has a negative effect with regard to optimum utilisation of the capacity and protection from overcharging.

Charging using the reflex mode is the most expensive of the methods described so far, since it also entails the use of a microprocessor. By this method, a charge pulse of a certain duration is followed by a short, high-voltage discharge pulse, which is in turn followed by a short currentless phase used for measurement of the charging voltage.

A charging circuit for NiCd batteries in particular is known from DE-OS 30 40 852, in which the drop of the charge curve after complete charging of the batteries is used as the switch-off criterion for the charging operation, i.e. the negative delta voltage charge mode already described above is applied. This known circuit contains a digital memory whose stored value is adjusted to the charging voltage at preset intervals during charging, until the time at which the charging voltage reaches its maximum value. When the charging operation is continued, the charging voltage drops below the stored maximum value. A comparison of the actual charging voltage of the battery with the stored maximum value supplies the criterion for ending the charging operation.

The digital memory in this circuit is made up of a staircase voltage generator and an oscillator, with a binary counter serving as the staircase voltage generator. A drawback of this known circuit is that the charging voltage measured during the charging operation leads to poor charging results, since this voltage value also contains those resistance components based on the specific resistance, the electrode resistance and the electrolyte resistance, and not only on the electrochemical cell potential, which in itself best reproduces the charge state of a battery. A further drawback can be discerned in that the charging operation is ended too soon, i.e. before the battery is fully charged, in the event that the charging voltage drops for a short time and then rises again. This known circuit does not however ensure that the batteries are charged in every case with maximum capacity.

SUMMARY OF THE INVENTION

The object underlying the invention is therefore to provide a charging method for batteries, in particular for NiCd and NiH batteries, that uses to the fullest the available useful capacity of the cells to be charged, and at the same time affords extensive protection against overcharging.

This object generally is attained by the a charging method for storage batteries, in particular for NiCd (nickel cadmium) and NiH (nickel hydride) cells, wherein the said batteries are connected to a charging current source; the charging current source is cyclically separated from the batteries for a certain period in order to generate measurement intervals; the charging voltage is cyclically compared with a reference value during the measurement intervals; if the value of the charging voltage is greater than the reference value, the reference value is increased by a certain amount to match it to the actual value of the charging voltage and then stored; the number of measurement cycles in which the value of the measured charging voltage is consecutively equal to or less than the maximum stored reference is counted; and finally the charging current source is switched off or the charging current is reduced at a preset counter reading. In this way, the charging operation is ended or the charging current is reduced in the event that the charging voltage is equal to or smaller than the maximum stored reference value in several consecutive measurements. A certain number of these measurement cycles serves as the criterion for the end of charging.

To ascertain the appropriate number of these measurement cycles, an up-down counter is provided in an advantageous embodiment of the method in accordance with the invention, which counts is set to the highest or lowest counter reading at the start of the charging operation. If the up-down counter is set to the highest counter reading, it is in the up mode if the reference value has to be adjusted to the charging voltage. If by contrast the reference value is no longer adjusted, the up-down counter is switched to the down mode. The same procedure applies when the counter reading of the up-down counter is set to the lowest counter reading at the start of the charging operation. A certain counter reading now results in switch-off or reduction of the charging current.

Finally, it is possible in a further preferred embodiment of the invention to reduce the charging current step by step depending on the counter reading. This can ensure a residual charge that protects the battery.

A further object of the invention is to achieve the battery charging operation in accordance with the invention using an inexpensive circuit array. This is generally achieved with a circuit array whereby a peak value detector is provided that performs the voltage comparison between the reference value and the charging voltage, and the adjustment of this reference value. This peak value memory switches the up-down counter to up or down mode also depending on the result of the comparison. To control the charging current source, a D/A converter is connected behind the up-down counter, and can be provided, in a simple manner by weighting the counter outputs of the up-down counter with resistors. This circuit array in accordance with the invention can operate with minimized peripheral equipment and without using a microprocessor.

In accordance with a special embodiment of the circuit array in accordance with the invention, the peak value memory is designed such that only one cycle is supplied to it per measurement interval for adjusting the reference value to the charging voltage, in case the reference value is only slightly less than the value of the actual charging voltage. A slow approach to the actual charging voltage is ensured in an advantageous fashion, thereby substantially avoiding an overshoot of the maximum charge voltage, which is per se the optimum switch-off criterion.

It is of particular advantage if the S input of the up-down counter has a shift register connected in front of it. This ensures a reasonableness check on the measured values. The reference value is therefore only adjusted when the measured value comparisons have the same results several times consecutively. The same advantage is afforded by a further embodiment of the circuit array in accordance with the invention, where the R input of the up-down counter has a further shift register connected in front of it. This allows in advantageous fashion once-only or recurrent positive or negative voltage peaks in the charging voltage caused by cell-internal surface effects to be safely ignored.

BRIEF DESCRIPTION OF THE DRAWINGS

FIG. 3 shows a voltage/time diagram of a charge curve, FIG. 4 shows voltage/time diagrams for illustrating the measurement sequence control of the method in accordance with the invention.

DESCRIPTION OF THE PREFERRED EMBODIMENTS

The following illustrates and describes the invention on the basis of the Figures.

Figure 1:
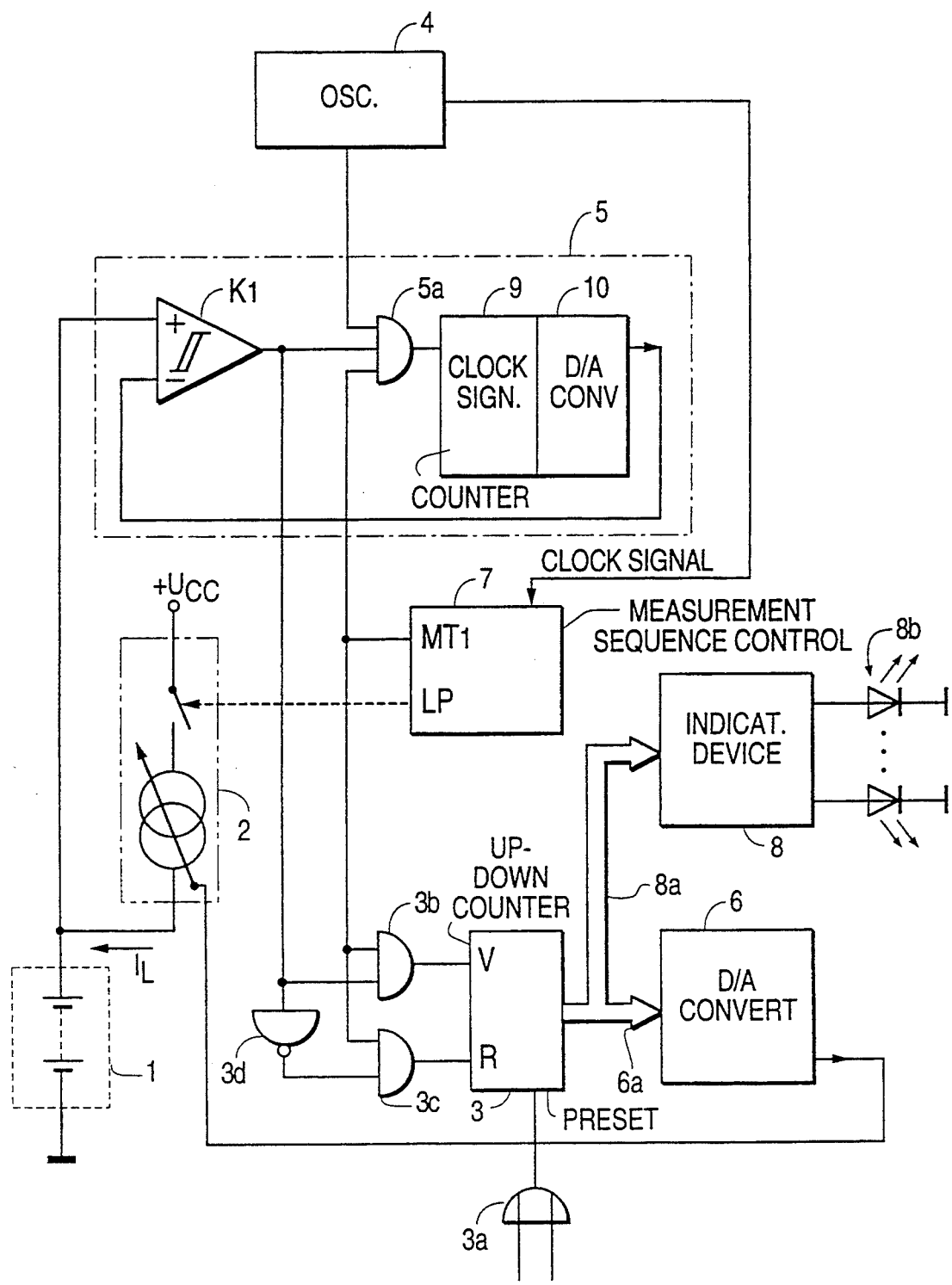
FIG. 1 shows a block diagram for implementation of the method in accordance with the invention.

In accordance with FIG. 1, a battery 1 is connected to a charging current source 2, which is connected via a switch to an operating voltage source $+U_{cc}$. This switch is controlled by a signal LP from a measurement sequence control 7 in order to interrupt the charging operation. In that way, for example, the switch is opened after a charge duration of 0.5 min. for the period of, for example, 2 s (cf. FIG. 4a), such that during this interval no charging current $I_L$ can flow into the battery 1. During this measurement interval, the charging voltage is measured using a peak value memory 5. This peak value memory 5 comprises a comparator K1, a counter 9, a D/A converter 10 and an AND gate 5a with three inputs. The clock signal for the counter 9 is supplied by an oscillator 4 whose output signal is passed to the first input of the AND gate 5a. The output of the AND gate 5a is connected to the clock signal input of the counter 9. The actual charging voltage of the battery 1 is applied to the non-inverting input of the comparator K1. This actual charge voltage is compared with the voltage value generated at the output of the D/A converter 10, and is hence applied to the inverting input of the comparator K1. This voltage value corresponds to the digital counter value of the counter 9. At the start of the charge process, the lowest counter value is at the inverting input of the comparator K1 and is less than the value of the charging voltage. An H-level is therefore applied to the output of this comparator K1, which is in addition connected to the second input of the AND gate 5a.

The measurement sequence control 7 generates, in addition to the LP signal for the charge interval cycle, a measurement release signal MT1 (cf. FIG. 4b) which is connected to the third input of the AND gate 5a. Whereas therefore the comparator K1 generates an H-level, the oscillator signal passes during the H-level of the measurement release signal MT1 to the clock signal input of the counter 9. The counter starts to count up, with every counter value being converted to corresponding analog value and supplied to the comparator K1 as a reference value. This reference value is therefore adjusted to the value of the actual charging voltage.

If the charging voltage drops in the further course of the charge operation or if the value of the actual charging voltage around the hysteresis value of the comparator K1 is below the reference value, the output of the comparator K1 switches to the L-level, with the result that no further clock signal reaches the counter 9.

The block diagram in FIG. 1 furthermore contains an up-down counter 3 which is controlled by the peak value memory 5 described above. This control is effected via the output of the comparator K1, which on the one hand is connected via an AND gate 3b to the V input of the up-down counter 3 and on the other hand is connected via a NOT gate 3d and a further AND gate 3c to the R input of the up-down counter 3. The two AND gates 3b and 3c each have two inputs, one of which is connected to the MT1 input of the measurement sequence control 7 for clocking the up-down counter 3.

At the start of the charge process, this up-down counter 3 is set to the fully counted state. This means that when the charging voltage rises, i.e. when this voltage has a greater value than the reference value, the up-down counter cannot have a higher reading. Since in this case the H-level of the comparator output is inverted with the NOT gate 3d, this has no effect on the R input. The output of the AND gate 3c does not switch to H-level during the H-level of the measurement release signal MT1 until the comparator K1 changes over to L-level, so that the up-down counter 3 now operates in the down mode.

An OR gate 3a with two inputs is connected in front of the preset input of the up-down counter 3, to which inputs a power-on preset signal or a battery recognition reset signal is applied.

A D/A converter 6 is connected behind the up-down counter 3 via a bus line 6a, and an indicating device 8 via a bus line 8a. The indicating device 8 itself controls indicating elements 8b.

The D/A converter 6 now generates, depending on the counter reading of the up-down counter 3, voltage values for controlling the charging current source 2. With each measurement not requiring adjustment of the reference value, the up-down counter is decremented and at the same time the charging current is reduced, in order to ensure a residual charge that preserves the battery. If the lowest charging current value is not achieved, only a float charge is performed. The respective charge state is indicated by the indicating elements 8b.

Figure 2:
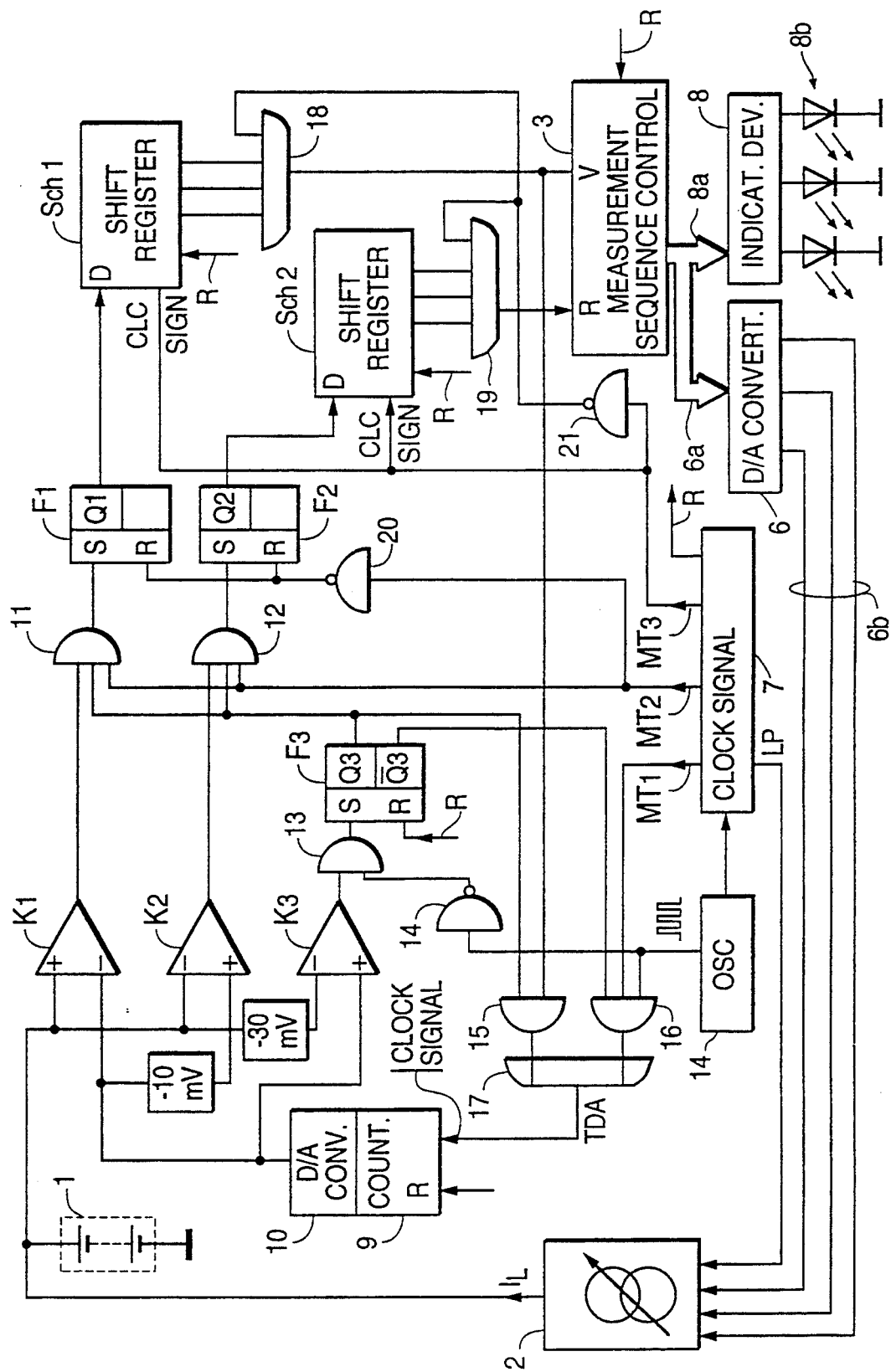
FIG. 2 shows a circuit array for implementation of the method in accordance with the invention.

FIG. 2 now shows a circuit example of the block diagram in accordance with FIG. 1. The voltage diagrams according to FIGS. 3 to 5 are used to illustrate the function of this circuit.

In FIG. 2, the numbers 1 to 4 and 6 to 8 refer to the same elements as in FIG. 1, i.e. the batteries to be charged, a charging current source, an up-down counter, an oscillator, a D/A converter, a measurement sequence control and an indicating device. To generate measurement intervals, the measurement sequence control 7 generates a charge interval cycle signal LP in accordance with FIG. 4a. Accordingly, after a charge phase of 0.5 min., for example, the charging current source 2 is switched off for a duration of 2 s, for example. During this measurement interval, the charging voltage is detected, during the H-level of the measurement release signal MT1 likewise generated by the measurement sequence control 7 in accordance with FIG. 4b.

Furthermore, the measurement sequence control 7 generates a blackout signal MT2 and an MT3 signal. The measurement release signal MT1 is not generated simultaneously with the start of the measurement interval in accordance with FIG. 4b, but with a time-lag of, for example, 20 ms. In this way, electrical and electrochemical balancing processes which would otherwise falsify the measured charging voltage value can be eliminated. The meanings of the other signals MT2 and MT3 are explained in connection with the respective functions.

Finally, a 10-bit counter and a D/A converter connected behind the latter are designated with the same number 9 and 10 as in FIG. 1.

To perform the voltage comparison between the charging voltage and the reference value generated by the D/A converter 10, not only the comparator K1 is used but also two further comparators K2 and K3. The charging voltage of the batteries 1 passes directly to the non-inverting input of the comparator K1 and to the inverting input of comparator K2, while the charging voltage reduced by 30 mV is applied to the inverting input of the comparator K3. The output of the D/A converter 10 is connected directly to the inverting input of the comparator K1 and to the non-inverting input of the comparator K3. The non-inverting input of the comparator K2 is by contrast supplied with the reference value reduced by 10 mV. The AND gates 11, 12 and 13 are connected behind the outputs of the three comparators K1, K2 and K3 respectively, with the two first-named gates 11 and 12 having three inputs and the last-named gate 13 two inputs. Furthermore, three reset flip-flop circuits F1, F2 and F3 are provided, whose S-inputs are controlled by a respective AND gate 11, 12 or 13. The second inputs of the AND gates 11 and 12 are connected to the $Q_3$ output of the reset flip-flop F3 connected behind the AND gate 13. The second input of the AND gate 13 connected behind the comparator K3 is supplied via a NOT gate 14 with the oscillator clock signal of the oscillator 4. The third inputs of the two AND gates 11 and 12 are supplied with the blackout signal MT2 (cf. FIG. 4c), while the blackout signal MT2 inverted by a NOT gate 20 is applied to the two R inputs of the reset flip-flops F1 and F2 connected behind the AND gates 11 and 12.

The outputs $Q_A$ and $Q_B$ of the reset flip-flops F1 and F2 respectively control a forward reasonableness check shift register SCH1 and a backward reasonableness check shift register SCH2 respectively. For this purpose, three bit shift registers with serial input and output are provided, for example.

The MT3 signal is supplied to these two shift registers SCH1 and SCH2 as the clock signal (cf. FIG. 4d). Connected behind the shift registers SCH1 and SCH2 are AND gates 18 and 19 respectively, each having four inputs of which the fourth in each case is supplied with the MT3 signal inverted by a NOT gate 21. The AND gate 18 connected behind the forward reasonableness check shift register SCH1 controls the V input, while the AND gate 19 connected behind the backward reasonableness check shift register SCH2 controls the R input of the up-down counter 3.

The D/A converter 6 and the indicating device 8 are connected via bus lines 6a and 8a respectively behind the up-down counter 3. The control voltages generated by the D/A converter 6 for the charging current source 2 are supplied to the latter via a connecting lead 6b.

To generate the clock signal for the counter 9, three gates are provided; an AND gate 15 with two inputs, a further AND gate 16 with three inputs, and finally an OR gate 17 whose two inputs are actuated by the AND gates 15 and 16 respectively and whose output leads directly to the clock signal input of the counter 9. The first input of the AND gate 15 is connected to the $Q_3$ output of the reset flip-flop F3, while its second input is controlled by the output of the AND gate 18 connected behind the forward reasonableness check shift register SCH1. The first input of the other AND gate 16 is connected to the $\overline{Q}_3$ output of the reset flip-flop F3, the second input of which is supplied with the measurement release signal MT1 and to whose third input the oscillator clock signal of the oscillator 4 is applied.

When a new charge process starts, for example when a new battery is inserted, a general reset pulse R is generated by the measurement sequence control 7 and sets the counter 9, the flip-flops F1, F2 and F3 and the shift registers SCH1 and SCH2 to their basic settings, while the up-down counter 3 is set to its maximum counter reading. The charge process first begins with a preliminary charge at low currents for a duration of, for example, one minute, as indicated in FIG. 3 for Part A of the charge curve. The preliminary charge has the task of preparing the battery for the subsequent main charge. This main charge is performed as a quick charge with a high charging current in accordance with Part B of the charge curve according to FIG. 3. At the start of the quick charge, the charge interval cycle is generated using the LP signal (cf. FIG. 4a) of the measurement sequence control 7.

At the start of the quick charge process, the reference voltage at the output of the D/A converter will be substantially lower than the charging voltage at battery 1. This has the result that at the output of the comparator K3 an L-level is generated such that the reset flip-flop F3 too has an L-level at its Q output. It is therefore only possible to generate an L-level at the outputs of the two AND gates 11 and 12. The H-level at the $\overline{Q}_3$ output of the reset flip-flop F3 has the effect that during the H-level of the measurement release signal MT1 the oscillator pulses of the oscillator 4 pass via the OR gate 17 to the clock signal input of the counter 9. This state is shown in FIG. 5, where the output of the comparator K3 is at the L-level (cf. FIG. 5b) until the time $t_1$. In accordance with FIGS. 5d and 5g, the counter 9 is therefore incremented with every positive flank of the oscillator clock signal in order to ensure rapid adjustment up to the vicinity of the actual charging voltage.

Figure 5A:
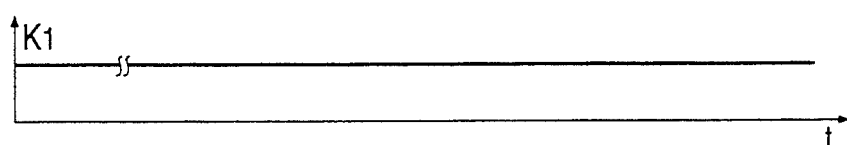
FIG. 5 shows voltage/time diagrams for illustrating the method in accordance with the invention.
Figure 5B:
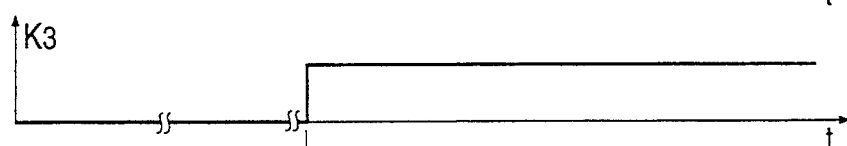
Figure 5C:
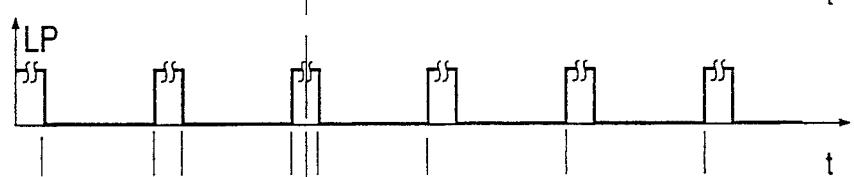
Figure 5D:
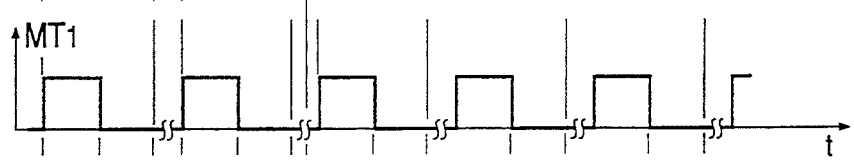
Figure 5E:
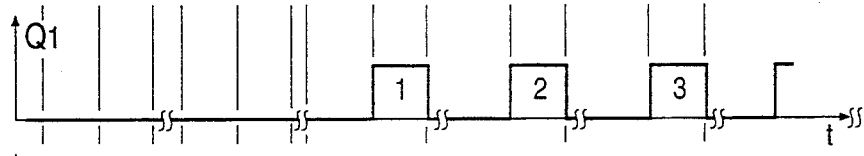
Figure 5F:
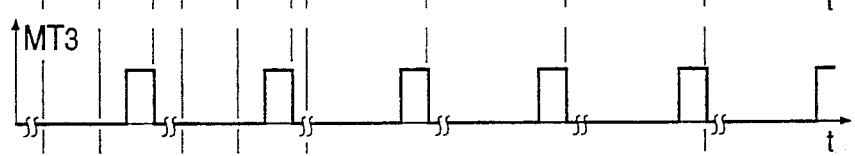

If the adjusted reference voltage now comes within 30 mV of the actual charging voltage, the comparator K3 switches to the H-level at time $t_1$ according to FIG. 5b, so that at the next negative flank of the oscillator clock signal the reset flip-flop F3 is set. By using the negative flank of the oscillator 4 and the time-lag that this entails, any voltage peaks occurring in the D/A converter 10 during incrementation are neutralized by the positive flank of the oscillator clock signal. Both the second inputs of the two AND gates 11 and 12 and the first input of the AND gate 15 are now at the H-level. Since the actual charging voltage is still greater than the reference value, the comparator K1 continues to generate an H-level, while the comparator K2 generates an L-level. Therefore the S input of the flip-flop F1 is actuated with the positive flank of the MT2 signal, with the reset flip-flop F1 having been reset beforehand with the NOT gate 20 on account of the inversion of the MT2 signal. In the following, therefore, an L-level is generated with every positive flank of the MT2 signal, as is shown in FIG. 5e. These $Q_1$ pulses are supplied with each MT3 signal as clock signals into the forward reasonableness check shift register SCH1. After three consecutive $Q_1$ pulses, there is an H-level at the three outputs of the shift register SCH1.

Figure 5G:
Figure 5H:
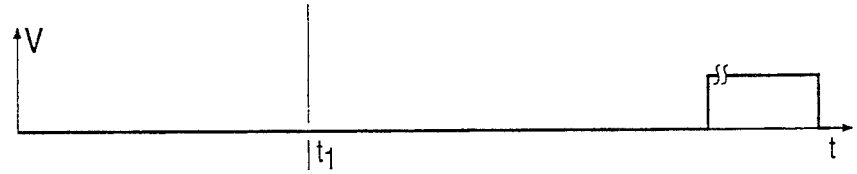

With the negative flank of the MT3 signal (cf. FIG. 3d), this H-level is applied both to the V input of the up-down counter 3 and to the second input of the AND gate 15. As a result, only a single clock signal TDA in accordance with FIG. 5g is generated for the counter 9 during a measurement interval. This ensures a slow approach to the actual charging voltage and prevents this voltage being exceeded. The fact that an adjustment of the D/A converter 10 only takes place when measured value comparisons give the same result several times consecutively means that once-only or recurrent positive or negative voltage peaks in the charging voltage can be safely ignored. In accordance with FIGS. 5g and 5h, therefore, every forward clock signal V for the up-down counter 3 results in only one counter clock signal TDA being passed on at the same time for the counter 9.

Figure 6A:
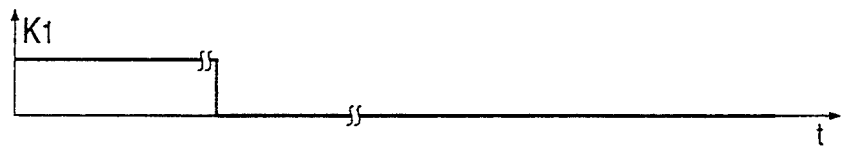
FIG. 6 shows further voltage/time diagrams for illustrating the method in accordance with the invention.
Figure 6B:
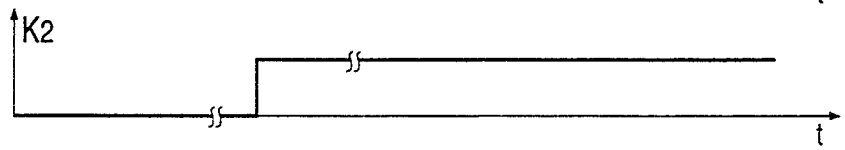
Figure 6C:
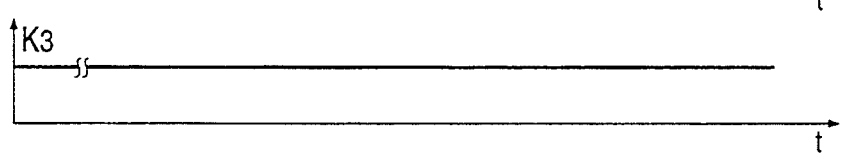
Figure 6D:
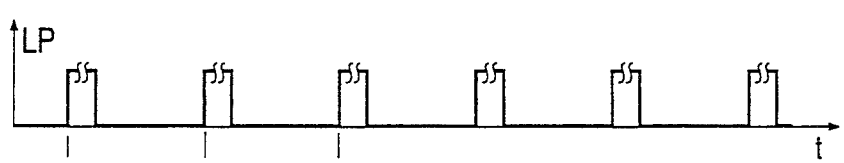
Figure 6E:
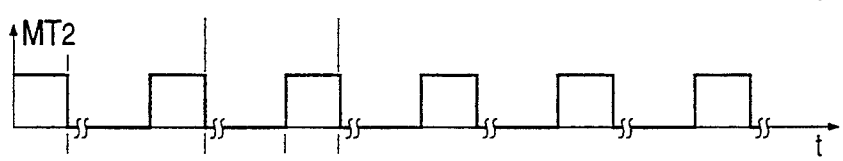
Figure 6F:
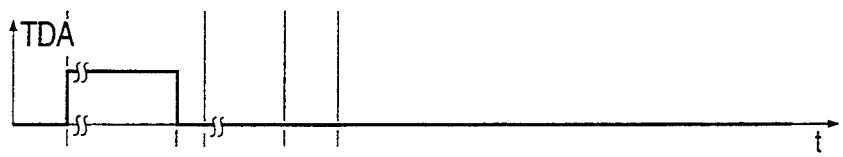
Figure 6G:
Figure 6H:
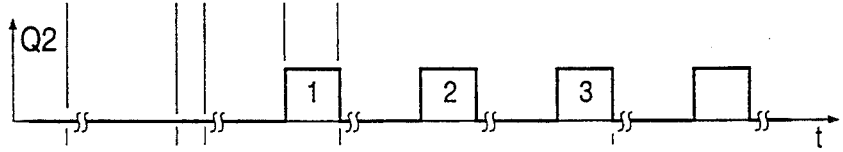
Figure 6I:
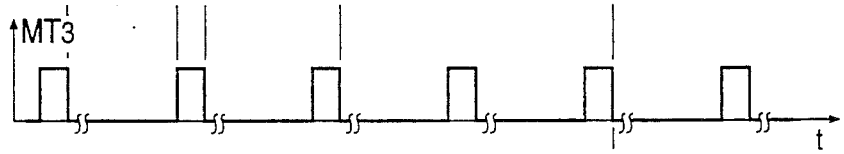
Figure 6J:

If the capacity limit of the battery is now reached during the further charging operation, the internal heating prevents a further rise in the charging voltage. This is hinted at in Part C of the charge curve of FIG. 3. This has the result that the comparator K1 switches to the L-level in accordance with FIG. 6a. Slightly later, the comparator K2 switches to the H-level when the charging voltage has dropped to a value which is 10 mV below the maximum stored reference value. Since the comparator K3 also generates an H-level (cf. FIG. 6b), the reset flip-flop F3 is set and, with the H-level of the MT2 signal, also the reset flip-flop F2. If the same measured value difference is recognized several times, a pulse in accordance with FIG. 6h is generated with every positive flank of the MT2 signal at output $Q_2$ of the flip-flop F2. These $Q_2$ pulses are supplied to the backward reasonableness check shift register SCH2 in time with the MT3 signal. The result is that after three consecutive $Q_2$ pulses, a backward pulse in accordance with FIG. 6j is generated that decrements the up-down counter 3. This leads step by step to a charging current reduction via the D/A converter 6. If the lowest charging current value is not attained, only a float charge is performed. This corresponds to Part D of the charge curve according to FIG. 3.

The corresponding charge states are indicated with the indicating elements 8b that are controlled by the indicating device 8.

The entire circuit as shown in FIG. 2 can be designed as an integrated circuit having only a small amount of peripheral equipment and operating without a microprocessor.

The circuit array according to FIG. 2 can also be designed such that at the start of the charge process the up-down counter 3 is set to the lowest reading. This counter is decremented when the actual charging voltage is greater than the reference value, and incremented only when the actual charging voltage is lower than the maximum stored reference value.

What is claimed is:

1. A charging method for a storage battery, in particular for NiCd (nickel cadmium) and NiH (nickel hydride) cells comprising the following steps:
    connecting said battery to a charging current source;
    cyclically separating said charging current source from said battery for a certain period in order to generate measurement intervals;
    during said measurement intervals, cyclically comparing a measured charging voltage with a stored reference value;
    if the value of said charging voltage has an actual value greater than said reference value, increasing said reference value by a certain amount to match the reference value to the actual value of said charging voltage and then storing the increased reference value;
    counting the number of measurement intervals in which the measured charging voltage is consecutively equal to or less than the stored reference value;
    finally switching off said charging current source or reducing charging current at a preset count;
    and wherein said step of counting includes
        providing an up-down counter and setting the counter at the start of a charging operation to its highest or lowest reading,
        when the increased reference value is stored, switching said up-down counter to its up mode or down mode, respectively, and
        switching said up-down counter to its down mode or up mode, respectively, if the actual value of said charging voltage is less than said stored reference value.

2. A method according to claim 1, wherein said charging current ($I_L$) is set depending on the count of said up-down counter.

3. A method according to claim 2, wherein said charging current ($I_L$) is reduced step by step depending on said count.

4. A circuit array for charging a storage battery, in particular for NiCd (nickel cadmium) and NiH (nickel hydride) cells, comprising:
    a charging current source for connection to a battery;
    means for cyclically separating said charging current source from said battery for a certain period of time in order to generate measurement intervals;
    means for cyclically comparing a charging voltage at the source with a stored reference value during said measurement intervals and, if the value of said charging voltage is greater than said reference value, for increasing said reference value by a certain amount to match said reference value to an actual measured value of said charging voltage and for then storing the increased reference value, said means for comparing including a peak value memory and a pulse generator for generating a clock signal for said peak value memory;
    means for counting the number of measurement intervals in which the value of the measured charging voltage is consecutively equal to or less than the stored reference value, with said means for counting including an up-down counter that is set at the start of a charging operation to the highest or lowest count and logic circuit means, controlled by comparison results from said peak value memory, for switching said up-down counter into its up mode or down mode, respectively, when the increased reference value is stored, and for switching said up-down counter into its down mode or up mode, respectively, when the actual value of said charging voltage is less than said stored reference value; and,
    means, responsive to a preset count in said up-down counter, for switching off said charging current source or for reducing charging current step by step depending on said count in said counter, said means for switching including a D/A converter connected behind said up-down counter and supplying a control voltage corresponding to said count of said up-down counter to said charging current source to control the charging current.

5. A circuit array according to claim 4, wherein means are provided to supply said peak value memory with only one cycle per measurement interval in the event that said reference value stored in said peak value memory is less than the value of said actual charging voltage by a preset minor amount.

6. A circuit array according to claim 5, wherein a shift register is connected in front of a V input of said up-down counter.

7. A circuit array according to claim 6, wherein a further shift register is connected in front of an R input of said up-down counter.

8. A circuit array according to claim 7, wherein said peak value memory controls said up-down counter to switch into the down mode or the up mode respectively only when said actual charging voltage has dropped by a certain minor amount below the stored reference value.

* * * * *